(No Model.)

G. B. HIGGINS.
BASKET.

No. 402,825. Patented May 7, 1889.

WITNESSES.
C. W. H. Brown,
E. B. Griffith.

INVENTOR.
George B. Higgins
By C. P. Jacobs
atty.

UNITED STATES PATENT OFFICE.

GEORGE B. HIGGINS, OF NORTH INDIANAPOLIS, INDIANA.

BASKET.

SPECIFICATION forming part of Letters Patent No. 402,825, dated May 7, 1889.

Application filed January 31, 1889. Serial No. 298,279. (No model.)

*To all whom it may concern:*

Be it known that I, GEORGE B. HIGGINS, of North Indianapolis, county of Marion, and State of Indiana, have invented certain new and useful Improvements in Baskets; and I do hereby declare that the following is a full, clear, and exact description thereof, reference being had to the accompanying drawings, in which like letters refer to like parts.

My invention relates to the construction of splint baskets, and will be understood from the following description.

Figure 1:
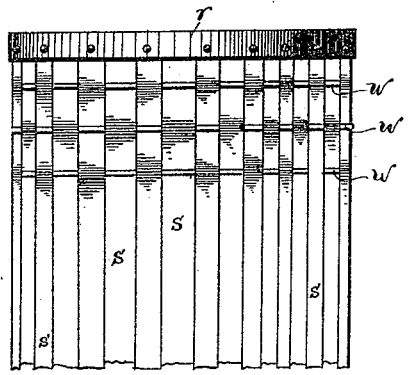
Figure 2:
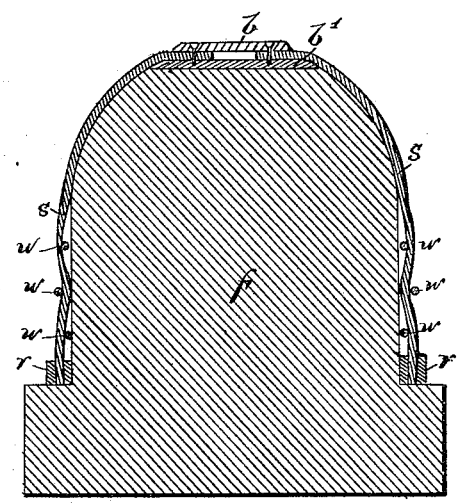
Figure 3:
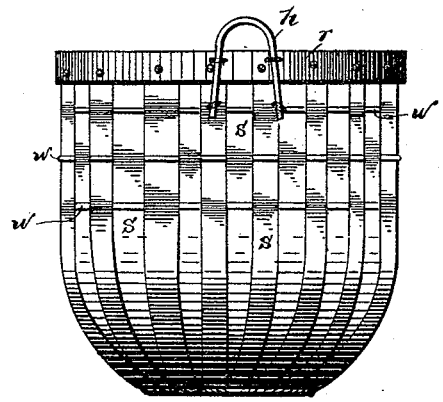

In the drawings, Figure 1 is a plan of the body part of the basket, showing the wires interwoven with the splints, the upper rim in place. Fig. 2 is a sectional view of the basket set upon a former, the lower end closed and secured between the bottom pieces. Fig. 3 is a view of the completed basket.

Heretofore splint baskets have been constructed generally of two series of splints crossing each other at right angles and interwoven with each other, and the same interweaving carried out at the lower end forming the bottom, and in some instances wooden pieces have been placed inside the basket over the woven bottom for protecting the ends of the splints below.

My basket is constructed of a series of vertical splints, $s$, crossed by wire hoops $w$, interwoven about the upper part of the basket, as shown in Fig. 1. The rim $r$ is riveted to the upper ends of the splints and a hoop is set inside the rim in the usual manner, as shown in Fig. 2, and the handles $h$ are wired to the rim and to the splints below.

When the body of the basket has been made, as shown in Fig. 1, it is placed over a forming-block, $f$, and the lower ends of the splints are then bent around toward each other to form the bottom, and the inside piece, $b'$, being placed beneath the ends of the splints, the outside piece, $b$, is placed over the splints, and nails are driven from below through the piece $b$ and the splints into the inner bottom piece, $b'$, thus uniting the two bottom pieces and the ends of the splints together, forming a solid bottom. The wires $w$ are only used about half-way from the rim to the bottom, for when the basket-body is placed upon the former the ends of the splints, being brought about the rounded end of the block, are drawn closely together, and when secured between the wooden bottom pieces, $b$ $b'$, by means of nails driven through all, the lower part of the basket is made very solid, and the wires $w$ are not necessary below the point indicated in Fig. 1.

What I claim as my invention, and desire to secure by Letters Patent, is the following:

1. The basket herein shown, composed of a series of vertical splints, $s$, interwoven with wires $w$ passing under one splint and over the next about the body of the basket, the ends of the splints turned inward at the bottom and secured between the outer and inner bottom pieces, $b$ $b'$, by nails or rivets, substantially as shown and described.

2. A basket composed of vertical splints $s$, forming the body thereof, wires $w$, interwoven with such splints, the tops secured to an outer rim, $r$, and the lower ends of the splints curved together and secured to one or more bottom pieces, substantially as shown and described.

In witness whereof I have hereunto set my hand this 24th day of January, 1889.

GEO. B. HIGGINS.

Witnesses:
C. P. JACOBS,
E. B. GRIFFITH.